United States Patent [19]

Giordano

[11] 4,337,423
[45] Jun. 29, 1982

[54] DUAL OUTPUT SWITCHING CIRCUIT

[75] Inventor: Raymond L. Giordano, Flemington, N.J.

[73] Assignee: RCA Corporation, New York, N.Y.

[21] Appl. No.: 171,833

[22] Filed: Jul. 24, 1980

[51] Int. Cl.³ .............................................. H02P 1/22
[52] U.S. Cl. ..................................... 318/280; 318/293
[58] Field of Search ............... 318/280, 284, 256, 739, 318/257, 293, 291, 54, 65; 361/2, 3, 171, 172; 307/38, 40, 41, 138

[56] References Cited

U.S. PATENT DOCUMENTS

| | | | |
|---|---|---|---|
| 2,264,993 | 12/1941 | McShane | 318/280 |
| 3,110,851 | 11/1963 | Plogstedt et al. | 318/257 X |
| 3,144,598 | 8/1964 | Merritt | 318/257 X |
| 3,525,883 | 8/1970 | Iordanidis | 318/293 X |
| 3,568,024 | 3/1971 | Robbins | 318/280 X |
| 3,825,852 | 7/1974 | Pinckaers | 330/30 D |
| 3,978,384 | 8/1976 | Gucker | 318/280 X |
| 4,124,811 | 11/1978 | Anderson | 318/293 |

*Primary Examiner*—Ulysses Weldon
*Attorney, Agent, or Firm*—P. J. Rasmussen; P. M. Emanuel; A. J. Jacobson

[57] ABSTRACT

A switching circuit provides first and second output signals to respective first and second output load devices that are switched responsive to an input signal. The switching point of the first output signal is set relative to the switching point of the second output signal to achieve "make before break" or "break before make" switching of the first and second output load devices. In particular, the switching circuit uses an emitter coupled differential amplifier having first and second differential output signals. Each of the first and second differential output signals is received by a respective first and second current mirror amplifier for converting each differential output signal to the respective first and second output signal. The switching point of the first output signal is determined by the ratio of the output current to input current of the first current mirror amplifier, while the switching point of the second output signal is determined by the ratio of output current to input current of the second current mirror amplifier.

10 Claims, 3 Drawing Figures

DUAL OUTPUT SWITCHING CIRCUIT

FIELD OF THE INVENTION

This invention relates to switching circuits for providing at least two switchable output signals.

BACKGROUND OF THE INVENTION

In switching applications wherein two output devices are switched in response to the same input control signal, it is often desirable to switch one output device off before switching the other output device on. For example, in a motor direction control circuit, a current sourcing device and current sinking device for controlling the direction of current flow through a motor are alternately operated in response to an input logic signal. The logic state of the input signal controls which of the current sourcing or sinking devices is operated, and therefore represents the direction of motor rotation. In order to avoid sourcing and sinking current simultaneously, which would cause excessive currents when switching, the current sourcing device is turned off before the current sinking device is turned on and vice versa. The latter switching logic is commonly called "break before make" switching logic and is employed to avoid the condition wherein both output devices are simultaneously switched on, even momentarily.

Conversely, in other switching applications, the complement of "break before make", i.e., "make before break" switching logic is desirable in order to avoid the condition wherein two output devices are switched off simultaneously. Such condition is undesirable, for example, in switching first and second signal sources to an audio amplifier input wherein an open circuit condition at the amplifier input produces noise. In such case, it is desirable to connect the second signal source to the amplifier input before disconnecting the first signal source. In still further switching applications, it may be desirable to avoid a condition wherein one output device is on while the other is off.

SUMMARY OF THE INVENTION

The present invention is embodied in a switching circuit providing first and second output signals in response to an input signal. The switching circuit includes two current control devices, each having an input electrode and two output electrodes. The two current control devices are connected in a differential amplifier configuration, the input signal being coupled to the input electrodes of the first and second current control devices. The switching circuit also includes first and second current amplifier arrangements, each having a respective input electrode and output electrode. A first output electrode of each current control device is connected to one of the input and output electrodes of a respective current amplifier, and the second output electrode of each current control device is connected to the other one of the input and output electrodes of the respective current amplifier. The output electrodes of the first and second current amplifiers provide the first and second output signals, respectively, from the switching circuit.

The switching point of the first output signal is determined by the current transfer ratio of the first current amplifier. The switching point of the second output signal is determined by the current transfer ratio of the second current amplifier. By appropriate choice of current transfer ratios of the first and second current amplifiers, the switching point of the first output signal is offset from the switching point of the second output signal, thereby achieving the desired output switching function.

DETAILED DESCRIPTION

Figure 1:
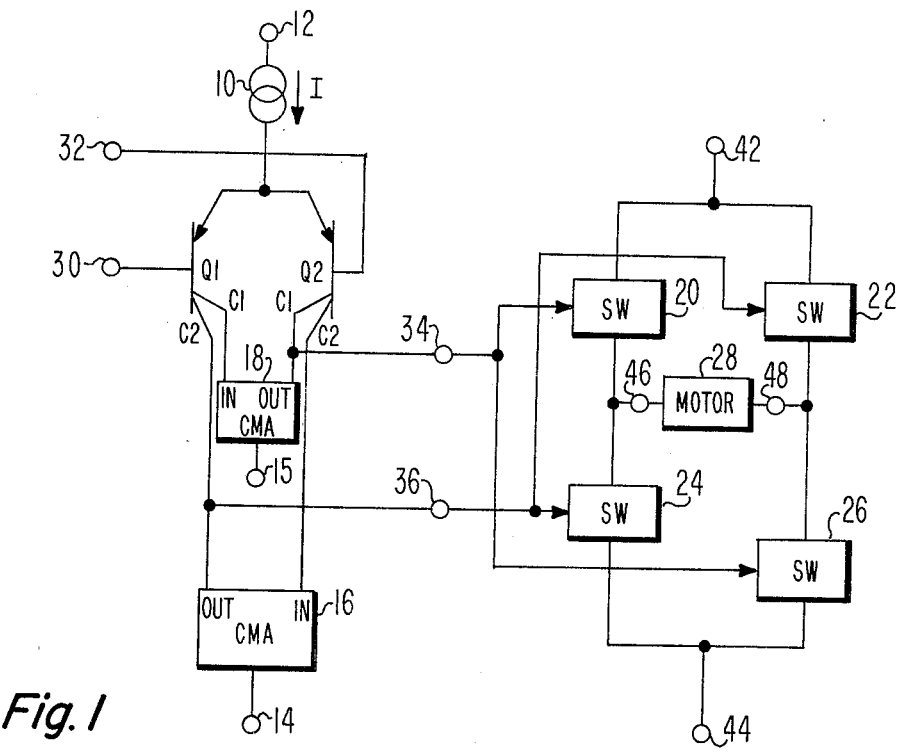
FIG. 1 is a schematic diagram, partially in block form, illustrating a dual output switching circuit embodying the present invention for controlling the direction or rotation of an electric motor.

A dual output switching circuit for controlling the direction of motor rotation from an input logic signal is shown in FIG. 1. The switching circuit comprises two emitter coupled transistors Q1 and Q2 arranged in a differential amplifier configuration, a current source 10, and two current mirror amplifiers 16, 18. As used herein, a current mirror amplifier (CMA) is defined as a circuit arrangement having input and output terminals, wherein output current at the output terminal thereof is substantially proportional to input current at the input terminal thereof. Transistors Q1 and Q2 have respective dual collector electrodes C1 and C2. One collector C1 of transistor Q1 is connected to the input of CMA 18, while the other collector C2 of transistor Q1 is connected to the output of CMA 16. One collector C1 of transistor Q2 is connected to the output of CMA 18, while the other collector C2 of transistor Q2 is connected to the input of CMA 16. Current is supplied to the differential amplifier Q1, Q2 by a current source 10 connected from the emitter electrodes of Q1 and Q2 to terminal 12. Terminal 12 receives an operating potential. The common terminals of CMAs 16 and 18 are connected to respective sources of reference potential or to a single convenient source of reference potential such as ground potential through respective terminals 14 and 15.

The switching circuit has two output signals. One output signal is provided at terminal 34 by a connection from the output terminal of CMA 18. The other output signal is provided at terminal 36 by a connection from output terminal of CMA 16.

The direction of motor rotation is determined by the direction of current through the motor 28 between motor terminals 46 and 48. Towards this end, four switches 20, 22, 24, 26 are provided in a bridge configuration between terminals 42 and 44, which terminals are connected to respective sources of energizing potential.

The output signal from the switching circuit at terminal 34 is connected to the control electrodes of switches 20 and 26. The output signal from the switching circuit at terminal 36 is connected to the control electrode of switches 22 and 24. Each switch 20, 22, 24, 26 is rendered conductive in response to the application of a current sourcing control signal applied at its respective control electrode, and is rendered nonconductive in response to a current sinking control signal applied at its respective control electrode. For example, a positive current flow from terminal 34 to the control electrode of switch 20 conditions that switch to conduct current between terminals 42 and 46, whereas zero current or negative current flow to terminal 34 conditions that switch to conduct essential zero current between terminals 42 and 46.

In operation, an input logic signal for controlling motor direction is coupled to terminals 30 and 32 at the base electrode of transistors Q1 and Q2. The input signal may be differentially applied between terminals 30 and 32, or alternatively, may be applied to terminal 30, and a fixed potential applied at terminal 32.

To describe the operation of the circuit in FIG. 1, assume that current source 10 provides 200 milliamperes (ma), that respective dual collectors C1, C2 are of equal size so that the output current of each of transistors Q1 and Q2 is divided equally between its respective dual collectors, and that each of CMAs 16 and 18 provides an output current at its respective output terminal equal to 4 times the input current provided at its respective input terminal.

When the input signal between terminals 30 and 32 corresponds to logic 0 it is assumed that transistor Q1 is conditioned to conduct essentially all of the 200 ma current from source 10, and transistor Q2 is conditioned to be nonconductive. In this condition, respective collector electrodes C1, C2 of transistor Q1 therefore provide 100 ma each. Since the input to CMA 16 is 0 ma, the output thereof is also 0 ma. Therefore, the 100 ma from collector C2 of transistor Q1 is sourced to output terminal 36, causing switches 22 and 24 to conduct. At the same time, since the input to CMA 18 is 100 ma, the output thereof will demand 400 ma. Since the collector electrode C1 of transistor Q2 cannot supply any of this current, a current sink of 400 ma is provided at terminal 34, causing switches 20 and 26 to be nonconductive, therefore, current through the motor 28 is provided in a first direction: i.e. from terminal 42 through switch 22 to terminal 48; from terminal 48 through motor 28 to terminal 46; and from terminal 46 through switch 24 to terminal 44.

When the input signal between terminals 30 and 32 corresponds to logical 1 it is assumed that transistor Q2 is conditioned to conduct essentially all of the 200 ma current from source 10, and transistor Q1 is conditioned to be essentially nonconductive. Collector electrodes C1 and C2 of transistor Q2 therefore provide 100 ma each. Since the input to CMA 18 is 0 ma, the output thereof is also 0 ma. Therefore, the 100 ma from collector C1 of transistor Q2 is sourced to output terminal 34, causing switches 20 and 26 to conduct. At the same time, since the input to CMA 16 is 100 ma, the output of CMA 16 will demand 400 ma. Since the collector electrode C2 of transistor Q1 cannot supply any of this current, a current sink of 400 ma is provided at terminal 36, causing switches 22 and 24 to be nonconductive. Therefore, current through the motor 28 is established in a second direction, opposite to the first direction: i.e., from terminal 42 through switch 20 to terminal 46; from terminal 46 through motor 28 to terminal 48; and from terminal 48 through switch 26 to terminal 44.

If the switch control signals at terminal 34 and 36 simultaneously provide current sourcing signals, then a direct connection between terminals 42 and 44 will be established via switch means 20 and 24, and also via switch means 22 and 26. This condition causes an excessive current to flow between terminals 42 and 44. To avoid such excessive peak current between terminals 42 and 44, the current control signals at terminals 34 and 36 should provide a "break before make" switching function wherein switch means 20 and 26 are rendered nonconductive before switch means 22 and 24 are rendered conductive, and vice versa.

Break before make switching logic may be achieved by setting the switching point of the output signal at terminal 34 offset from the switching point of the output signal at terminal 36. The switching point is defined herein as that value of input signal at which the output signal switches its respective output load device, i.e. that value of input signal at which the output signal is directly between a current sourcing and a current sinking condition. Therefore, at the switching point of each respective output signal, substantially no output current flows.

In the present arrangement, the current transfer ratios of CMAs 16 and 18 determine the switching point of each respective output signal at terminals 36 and 34. Specifically, the respective current transfer ratios have been chosen to shift respective switching points so as to create a dead zone between switching signal at terminals 36 and 34 in which none of the switches 20, 22, 24, 26 are conductive and no current is provided to the motor 28.

In order to illustrate how the switching points of the output signals at terminals 34 and 36 are shifted to create a break before make logic function, consider the following numerical example of circuit conditions for various input signal levels.

When the input signal level is at logic 0, switches 22 and 24 are conductive, while switches 20 and 26 are nonconductive. As the input signal switches between logic 0 and logic 1, transistors Q1 and Q2 divide the 200 ma current from source 10 in accordance with the potential difference between the base electrodes of Q1 and Q2. Consider the point during transition from logic 0 to logic 1 wherein it is assumed transistors Q1 and Q2 divide the 200 ma current as 160 ma and 40 ma respectively. Therefore, the collector electrodes C1 and C2 of transistor Q1 provide 80 ma each and the collector electrodes C1 and C2 of transistor Q2 provide 20 ma each. Since input to CMA 16 is 20 ma, its output will demand 80 ma because the current transfer ratio for CMA 16 is 4:1. Since the collector electrode C2 of transistor Q1 supplies 80 ma, no current will be sourced or sinked at terminal 36. This is the switching point for the control signal at terminal 36, beyond which, switches 22 and 24 are disabled. At the same time, the input to CMA 18 being 80 ma, its output will demand 320 ma because the current transfer ratio for CMA 18 is 4:1. However, since the collector electrode C1 of transistor Q2 can supply only 20 ma, CMA 18 provides a current sink of 300 ma at terminal 34, therefore switch 20 and 26 remain nonconductive. Note that when the input signal is changing from logic 0 to logic 1, switch means 22 and 24 are disabled before switch means 20 and 26 are enabled.

When the potentials at the base electrodes of transistors Q1 and Q2 are equal, the 200 ma from source 10 is divided equally, i.e., 100 ma each transistor, 50 ma each collector. Since input to each CMA 16, 18 is 50 ma each respective CMA output will demand 200 ma. However, only 50 ma can be supplied by the respective collector electrode of Q1 and Q2 to which each CMA output is connected. Therefore, each CMA 16, 18 provides a respective current sink output of 150 ma at each output terminal 36 and 34 respectively. All switches 20, 22, 24, 26 are disabled. This condition corresponds to the midpoint of a dead zone when switching the rotation of motor 28 from one direction to another.

As the input signal continues its transition from logic 0 to logic 1, assume that a point is reached where transistors Q1 and Q2 divide the 200 ma current from source 10 as 40 ma and 160 ma respectively. Under these conditions, the collector electrodes C1 and C2 of transistor Q2 provide 80 ma each and the collector electrodes C1 and C2 of transistor Q1 provide 20 ma each. Since the input to CMA 18 is 20 ma, its output will demand 80 ma. Since the collector electrode C1 of transistor Q2 supplies 80 ma, no current will be sourced or sinked at terminal 34. This is the switching point for the control signal at terminal 34, beyond which, switches 20 and 26 are enabled. At the same time, the input to CMA 16 being 80 ma, its output will demand 320 ma. However, since the collector electrode C2 of transistor Q1 can supply only 20 ma, CMA 16 provides a current sink of 300 ma at terminal 36. Therefore, switches 22 and 24 remain nonconductive. Note that when the input signal is changing from logic 0 to logic 1, switches 20 and 26 are enabled after switch means 22 and 24 have been disabled. When the input signal is at logic 1, switches 22 and 24 are nonconductive, while switches 20 and 26 are conductive.

As the input signal switches back from logic 1 to logic 0, the above described circuit conditions occur in reverse sequence. First, at logic 1 input, switches 20 and 26 are enabled by a current sourcing signal at terminal 34 while switches 22 and 24 are disabled by a current sinking signal at terminal 36. During the transition of the input signal from logic 1 to logic 0, the switching point of the signal at terminal 34 is encountered first. Thus, the signal at terminal 34 switches from current sourcing to current sinking thereby disabling switches 20 and 26. As the input signal continues its transistion from logic 1 to logic 0, the switching point of the signal at terminal 36 is encounterred next. Thus, the signal at terminal 36 switches from current sinking to current sourcing thereby enabling switches 22 and 24. In such manner, a dead zone is created between the two respective switching points wherein all of the switches 20, 22, 24, 26 are nonconductive.

Figures 2, 3:
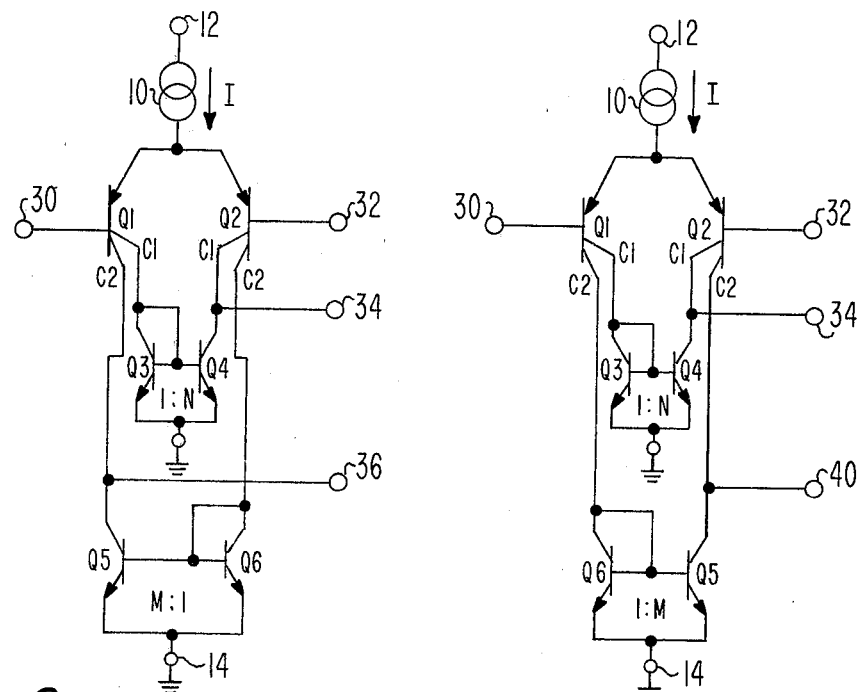
FIGS. 2 and 3 are each schematic diagrams illustrating alternate embodiments of the present invention.

FIG. 2 illustrates a specific circuit embodiment of the CMAs 16 and 18 which are shown in block form in FIG. 1. One CMA 16 comprises diode-connected transistor Q3, and transistor Q4. The current transfer ratio of the CMA Q3, Q4 is 1:N. This means that for 1 unit of input current, N units of output current are provided. The other CMA 18 comprises diode-connected transistor Q5, and transistor Q6. The current transfer ratio of current mirror amplifier Q5, Q6 is 1:M. A desired CMA transfer ratio, may be achieved scaling respective emitter-base junction areas of the mirroring transistors.

The switching point of the output signal at terminal 34 is $$V_{30} - V_{32} = V_t \ln N \qquad (1)$$

where $V_{30}$ is the potential at terminal 30 and $V_{32}$ is the potential at terminal 32. The coefficient $V_t$ is a temperature dependent variable. At room temperature, $V_t$ is about 34.6 millivolts. If N is unity, the switching point of the output signal at terminal 34 occurs when the potential difference between the base electrodes of transistors Q1 and Q2 is 0, because the logarithm of 1 is 0. For values of N larger than unity, the switching point is shifted in a positive direction; for values of N less than unity, the switching point is shifted in a negative direction.

The switching point of the output signal at terminal 36 is $$V_{30} - V_{32} = -V_t \ln M \qquad (2)$$

For values of M larger than unity, the switching point is shifted in a negative direction; for values of M less than unity the switching point is shifted in a positive direction. The difference between the switching points for respective output signals at terminals 34 and 36, obtained by subtracting equation (2) from equation (1), is $$V_t \ln N M \qquad (3)$$

A dead zone, or break before make switching logic, is achieved by choosing values for N and M such that the product NM is greater than unity. An overlapping active zone, or make before break switching logic is achieved by choosing values for N and M such that the product NM is less than unity.

FIG. 3 illustrates yet another embodiment of the present invention in which relative switching points of the output signals is controlled by current amplifier transfer ratios. The respective input and output terminals of CMA Q5, Q6 have been interchanged. The effect of such change is to logically invert the output signal, and to invert the direction of shift of the switching point of the output signal at terminal 40 in FIG. 3, as compared to the output signal at terminal 36 in FIG. 2. The output signals at terminal 34 and 40 have the same logical polarity. Also, the shift of the switching point relative to the respective current mirror transfer ratio for each output signal is in the same direction. Specifically, the switching point for the output signal at terminal 34 is the same as given in equation (1). The switching point for the output signal at terminal 40, however, is $$V_{30} - V_{32} V_t \ln M \qquad (4)$$

For values of N or M greater than unity each respective switching point is shifted in a positive direction, while for values of N or M less than unity each respective switching point is shifted in a negative direction. The difference between switching points which defines the dead zone or overlapping active zone for respective output signals at terminals 34 and 40, obtained by subtracting equation (4) from equation (1), is $$V_t \ln (N/M) \qquad (5)$$

Various substitutions of elements may be made in the circuits shown in FIGS. 1, 2, and 3. For example, current source 10 which supplies a substantially constant current to the emitter electrodes of transistors Q1 and Q2 may be a large value resistor. Furthermore, other types of CMAs may be used in lieu of the CMA shown. For example, the direct connection from collector to base of Q3 and Q5 may be replaced by respective emitter follower amplifiers so as to reduce base current error of each respective CMA. Bipolar transistors Q1 and Q2 may be replaced by any convenient current control device having a control electrode, a common electrode, and at least two respective output electrodes.

The switching circuit of the present invention may be used for controlling the direction of current through other types of output devices responsive to the direction of current therethrough, such as a solenoid. Further, the invention may be used in logic circuits, wherever it is desirable to set the relative switching points of two logic output signals responsive to an input signal to achieve a predetermined switching function.

What is claimed is:

1. A switching circuit comprising:
   first and second current conduction means each for selectively conducting respective first and second currents;
   control means for selectively enabling one of said first and second current conduction means to conduct its respective first and second currents in response to an input signal;
   first current transfer means having input and output terminals, one of which is connected for receiving said first current of said first current conduction means and the other of which is connected for receiving the first current of said second current conduction means;
   second current transfer means having input and output terminals, one of which is connected for receiving the second of said second current conduction means, and the other of which is connected for receiving the second current of said first current conduction means; and
   first and second utilization means coupled to said respective output terminals of said first and second current transfer means for receiving respective first and second output currents therefrom,
   wherein said first and second current transfer means provide respective first and second current transfer ratios between their respective input and output terminals, and
   wherein said first and second current transfer ratios are selected to define the order in which said first and second utilization means respond to said first and second output currents.

2. A switching circuit according to claim 1 wherein said first and second utilization means respectively comprise:
   first and second switches each having first and second electrodes, and a control electrode for selectively controlling the conductivity between its first and second electrodes, said first switch being connected to selectively conduct current between a first circuit node and a first power supply terminal, and said second switch being connected to selectively conduct current between said first circuit node and a second power supply terminal, the control electrodes of said first and second switches being connected to said respective output terminals of said first and second current transfer means.

3. A switching circuit according to claim 2 further comprising:
   third and fourth switches each having first and second electrodes, and a control electrode for selectively controlling the conductivity between its first and second electrodes, said third switch being connected to selectively conduct current between a second circuit node and said second power supply terminal, said fourth switch being connected to selectively conduct current between said second circuit node and said first power supply terminal, the control electrodes of said third and fourth switches being connected to the control electrodes of said first and second switches respectively; and
   current direction device means for providing operation in response to the direction of current therethrough, said current direction device means being connected to conduct current between said first and second circuit nodes.

4. A switching circuit according to claim 3 wherein said current direction device means is a motor having first and second terminals connected to said first and second circuit nodes respectively, for providing mechanical rotation in one direction in response to current flow from said first terminal to said second terminal, and mechanical rotation in the opposite direction in response to current flow from said second terminal to said first terminal.

5. A motor direction control circuit comprising:
   first and second current conduction means each for selectively conducting respective first and second currents;
   control means for selectively enabling one of said first and second current conduction means to conduct its respective first and second currents in response to an input signal;
   first current transfer means having input and output terminals one of which is connected for receiving said first current of said first current conduction means and the other of which is connected for receiving the first current of said second current conduction means;
   second current transfer means having input and output terminals, one of which is connected for receiving the second of said second current conduction means and the other of which is connected for receiving the second current of said first current conduction means;
   first, second, third and fourth switches each having first and second electrodes, and a control electrode for selectively controlling the conductivity between its first and second electrodes, the control electrodes of said first and third switches being connected to said output terminal of said first current transfer means, the control electrodes of said second and fourth switches being connected to said output terminal of said second current transfer means, said first switch being connected to selectively conduct current between a first circuit node and a first power supply terminal, said second switch being connected to selectively conduct current between said first circuit node and a second power supply terminal, said third switch being connected to selectively conduct current between a second circuit node and said second power supply terminal, said fourth switch being connected to selectively conduct current between said second circuit node and said first power supply terminal; and
   a motor having first and second terminals connected to said first and second circuit nodes respectively, said motor providing mechanical motion in one direction in response to current flow from said first terminal to said second terminal and providing mechanical motion in another direction in response to current flow from said second terminal to said first terminal;
   wherein said first and second current transfer means provide respective first and second current transfer ratios between their respective input and output terminals and said first and second current transfer ratios are selected to define the order in which said first and third switches, and said second and fourth switches, selectively conduct current between their respective first and second terminals.

6. A motor direction control circuit according to claim 5 wherein said first and second transfer ratios are selected so that when the direction of current through said motor is reversed, said first and third switches are selectively rendered nonconductive before said second and fourth switches are selectively rendered conductive, and said second and fourth switches are selectively rendered nonconductive before said first and third switches are selectively rendered conductive.

7. A switching circuit according to claim 1, wherein said input terminal of said first current transfer means is connected for receiving said first current of said first current conduction means, and said output terminal of said first current transfer means is connected for receiving said first output current of said second current conduction means.

8. A dual output switching circuit according to claim 7 wherein said input terminal of said second current transfer means is connected for receiving said second output current of said second current conduction means, and said output terminal of said second current transfer means is connected for receiving said second output current of said first current conduction means.

9. A switching circuit according to claim 7 wherein said input terminal of said second current transfer means is connected for receiving said second output current of said first current conduction means, and said output terminal of said second current transfer means is connected for receiving said second output current of said second current conduction means.

10. A dual output switching circuit according to claim 8 or claim 9 wherein said first and second current transfer means each comprise:

first and second transistors having respective first and second electrodes defining the ends of a principal current conduction path, and respective third electrode, the potential between respective first and third electrodes controlling the conductivity of its respective principal current conduction path, the second electrode of said first transistor being the input terminal of said current transfer means, the second electrode of said second transistor being the output terminal of said current transfer means, the first electrode of said first and second transistors being connected together; and means connecting the second electrode of said first transistor to the third electrodes of said first and second transistors for conditioning said first transistor to conduct the current applied at said input terminal of said current transfer means through the principal current conduction path of said first transistor.

* * * * *